United States Patent
Eoff et al.

(12)

(10) Patent No.: US 6,476,169 B1
(45) Date of Patent: Nov. 5, 2002

(54) METHODS OF REDUCING SUBTERRANEAN FORMATION WATER PERMEABILITY

(75) Inventors: Larry S. Eoff, Duncan, OK (US); B. Raghava Reddy, Duncan, OK (US); Eldon D. Dalrymple, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 146 days.

(21) Appl. No.: 09/677,826

(22) Filed: Sep. 28, 2000

(51) Int. Cl.[7] .............................................. C08F 120/54
(52) U.S. Cl. ................... 526/307.2; 526/259; 526/287; 526/292.2; 526/303.1; 526/318.4; 526/320; 526/328.5; 526/329.4
(58) Field of Search ................................. 526/259, 287, 526/292.2, 303.1, 307.2, 318.4, 320, 378.5, 329.4

(56) References Cited

U.S. PATENT DOCUMENTS

| | | | |
|---|---|---|---|
| 4,532,052 A | 7/1985 | Weaver et al. | 252/8.55 |
| 4,604,216 A | 8/1986 | Irvin et al. | 252/8.51 |
| 4,730,028 A | 3/1988 | Bock et al. | 526/225 |
| 5,071,934 A | 12/1991 | Peiffer | 526/307 |
| 5,146,986 A | 9/1992 | Dalrymple | 166/294 |
| 5,379,841 A * | 1/1995 | Pusch et al. | 166/295 |
| 6,277,900 B1 * | 8/2001 | Oswald et al. | 523/130 |

FOREIGN PATENT DOCUMENTS

| | | | |
|---|---|---|---|
| EP | 1 033 378 A1 * | 9/2000 | |
| GB | 2128659 A | 10/1983 | |
| WO | WO 93/15164 | 8/1993 | |
| WO | WO 99/49183 | 9/1999 | |
| WO | WO 99/50530 | 10/1999 | |

* cited by examiner

*Primary Examiner*—Helen L. Pezzuto
(74) *Attorney, Agent, or Firm*—Robert A. Kent; C. Clark Dougherty, Jr.

(57) ABSTRACT

Improved methods of treating water and hydrocarbon producing subterranean formations to reduce the water permeability thereof are provided. The methods basically comprise introducing into the formation a water flow resisting chemical which attaches to adsorption sites on surfaces within the porosity of the formation and reduces the water permeability thereof without substantially reducing the hydrocarbon permeability thereof. The water flow resisting chemical is comprised of a polymer of at least one hydrophilic monomer and at least one hydrophobically modified hydrophilic monomer.

25 Claims, No Drawings

METHODS OF REDUCING SUBTERRANEAN FORMATION WATER PERMEABILITY

BACKGROUND OF THE INVENTION

1. Field of the Invention

The present invention relates to methods of treating a water and hydrocarbon producing subterranean formation to reduce the water permeability thereof without substantially reducing the hydrocarbon permeability thereof.

2. Description of the Prior Art

The production of water with hydrocarbons, i.e., oil and/or gas, from wells constitutes a major problem and expense in the production of the hydrocarbons. While hydrocarbon producing wells are usually completed in hydrocarbon producing formations, when the formations contain layers of water and oil or when there are water producing zones near the hydrocarbon producing formations, the higher mobility of the water often allows it to flow into the wellbores which penetrate the hydrocarbon producing formations by way of natural fractures and/or high permeability streaks. In the production of such wells, the ratios of water to hydrocarbons recovered often become so high that the cost of producing the water, separating it from the hydrocarbons and disposing of it represents a significant economic loss.

In order to reduce the production of undesired water from hydrocarbon producing formations, aqueous polymer solutions containing cross-linking agents have been utilized heretofore. In the case of naturally fractured formations such aqueous polymer solutions have been pumped into the hydrocarbon producing formations so that they enter water zones within and adjacent to the formations and cross-link therein. The cross-linking of the polymer solutions causes them to form stiff gels which aid in stopping or reducing the flow of the undesired water. While the use of aqueous polymer solutions for reducing the production of undesired water has achieved varying degrees of success, the full blocking gels produced are not suitable for producing formation treatments unless the polymer solution can be placed solely in the offending water producing zone or zones therein. If a polymer solution is allowed to gel within a hydrocarbon producing zone, the cross-linked polymer gel formed will reduce or stop the flow of hydrocarbons in addition to the flow of water. The selected placement of a polymer solution in a producing formation requires expensive, time-consuming zonal isolation placement technology. In addition, even when a polymer solution is properly placed in a water producing zone, the cross-linked gels formed often do not remain stable in the zone due to thermal degradation and/or differences in the adsorption characteristics of the polymer and associated cross-linker and the like.

More recently, chemicals referred to as relative permeability modifiers have been utilized to decrease the production of water with hydrocarbons. That is, water permeability modifying chemicals such as polyacrylamide have been introduced into hydrocarbon and water producing formations so that the chemicals attach to adsorption sites on surfaces within the porosity of the formations. The presence of the chemicals in the formations has the effect of reducing the flow of water through the formations while having a minimal affect on the flow of hydrocarbons therethrough. The use of water permeability modifying chemicals in hydrocarbon and water producing formations to decrease the production of water is considerably less expensive than other techniques such as blocking the flow of water with cross-linked polymers, and does not require expensive zonal isolation techniques. However, the use of such hydrophilic water permeability modifying chemicals, e.g., polyacrylamides, have heretofore resulted in only small reductions in water production and/or unacceptable levels of reduction in hydrocarbon production.

Thus, there are needs for improved methods of treating water and hydrocarbon producing subterranean formations utilizing water permeability modifying chemicals which are more effective in reducing water production with minimal or no reduction in hydrocarbon production.

SUMMARY OF THE INVENTION

The present invention provides improved methods of treating water and hydrocarbon producing subterranean formations to reduce the flow of water through the formations while having a minimal affect on the flow of hydrocarbons therethrough which meet the needs described above and overcome the deficiencies of the prior art. The improved methods basically comprise the step of introducing into a hydrocarbon and water producing formation a water flow resisting chemical comprised of a polymer made from a combination of at least one hydrophilic monomer and at least one hydrophobically modified hydrophilic monomer. The water flow resisting chemical attaches to adsorption sites on surfaces within the porosity of the formation and reduces the water permeability thereof without substantially reducing the hydrocarbon permeability thereof.

Examples of particularly suitable water flow resisting polymers useful in accordance with this invention include, but are not limited to, an acrylamide/octadecyldimethylammoniumethyl methacrylate bromide copolymer, a dimethylaminoethyl methacrylate/vinyl pyrrolidone/hexadecyldimethylammoniumethyl methacrylate bromide terpolymer and an acrylamide/2-acrylamido-2-methyl propane sulfonic acid/2-ethylhexyl methacrylate terpolymer. These and other polymers which can be utilized preferably have a molecular weight in the range of from about 100,000 to about 10,000,000. Further the mole ratio of the hydrophilic monomer(s) to the hydrophobically modified hydrophilic monomer(s) in the polymers is preferably in the range of from about 99.98:0.02 to about 90:10.

The polymer utilized can be introduced into the formation to be treated in an aqueous carrier liquid solution and overflushed with a water compatible with the formation. After the formation is contacted with the solution and the polymer has attached to surfaces within the porosity of the formation, a secondary overflush of a hydrocarbon such as diesel oil (or a gas in the case of a hydrocarbon gas producing formation) is preferably introduced therein to facilitate the subsequent production of hydrocarbons therethrough.

It is, therefore, a general object of the present invention to provide improved methods of reducing subterranean formation water permeability.

Other and further objects, features and advantages of the present invention will be readily apparent to those skilled in the art upon a reading of the description of preferred embodiments which follows.

Description of Preferred Embodiments

The present invention provides improved methods of treating water and hydrocarbon producing subterranean formations to reduce the water permeability of the formation without substantially reducing the hydrocarbon permeability. The term "water" when used in reference to the water produced with hydrocarbons from subterranean formations includes salt water and brines.

The methods of this invention basically comprise the step of introducing into the formation a water flow resisting chemical comprised of a polymer made from a combination of at least one hydrophilic monomer and at least one hydrophobically modified hydrophilic monomer which attaches to adsorption sites on surfaces within the porosity of the formation. The presence of the polymer in the formation reduces the flow of water therethrough.

The polymers useful in accordance with this invention can be prepared from a variety of hydrophilic monomers and hydrophobically modified hydrophilic monomers. Examples of particularly suitable hydrophilic monomers which can be utilized include, but are not limited to, acrylamide, 2-acrylamido-2-methyl propane sulfonic acid, N,N-dimethylacrylamide, vinyl pyrrolidone, dimethylaminoethyl methacrylate, acrylic acid, dimethylaminopropylmethacrylamide, trimethylammoniumethyl methacrylate chloride, methacrylamide and hydroxyethyl acrylate. Of these, acrylamide, 2-acrylamido-2-methyl propane sulfonic acid, acrylic acid, dimethylaminoethyl methacrylate and vinyl pyrrolidone are preferred.

A variety of hydrophobically modified hydrophilic monomers can also be utilized to form the polymers useful in accordance with this invention. Particularly suitable hydrophobically modified hydrophilic monomers include, but are not limited to, alkyl acrylates, alkyl methacrylates, alkyl acrylamides and alkyl methacrylamides wherein the alkyl radicals have from about 4 to about 22 carbon atoms, alkyl dimethylammoniumethyl methacrylate bromide, alkyl dimethylammoniumethyl methacrylate chloride and alkyl dimethylammoniumethyl methacrylate iodide wherein the alkyl radicals have from about 4 to about 22 carbon atoms and alkyl dimethylammonium-propylmethacrylamide bromide, alkyl dimethylammonium propylmethacrylamide chloride and alkyl dimethylammonium-propylmethacrylamide iodide wherein the alkyl groups have from about 4 to about 22 carbon atoms. Of these, octadecyldimethylammoniumethyl methacrylate bromide, hexadecyldimethyl-ammoniumethyl methacrylate bromide, hexadecyldimethylammoniumpropyl methacrylamide bromide, 2-ethylhexyl methacrylate and hexadecyl methacrylamide are preferred.

Polymers which are useful in accordance with the present invention can be prepared by polymerizing any one or more of the hydrophilic monomers with any one or more of the hydrophobically modified hydrophilic monomers. While the polymerization reaction can be performed in various ways, an example of a particularly suitable procedure for polymerizing water soluble monomers is as follows. Into a 250 mL-3 neck round bottom flask, charge the following: 47.7 g DI water, 1.1 g acrylamide and 0.38 g alkyl dimethylammoniumethyl methacrylate bromide. The solution formed is sparged with nitrogen for approximately 30 minutes, followed by the addition of 0.0127 g of 2,2'-azobis (2-amidinopropane) dihydrochloride. The resulting solution is then heated, with stirring, to 110° F. and held for 18 hours to produce a highly viscous polymer solution.

When the hydrophobically modified hydrophilic monomer is not water soluble, e.g., octadecylmethacrylate, the following procedure can be utilized. Into a 250 mL-3 neck round bottom flask, charge the following: 41.2 g DI water and 1.26 g acrylamide. The solution formed is sparged with nitrogen for approximately 30 minutes, followed by the addition of 0.06 g of octadecyl methacrylate and 0.45 g of a cocoamidopropyl betaine surfactant. The mixture is stirred until a homogeneous, clear solution is obtained followed by the addition of 0.0055 g of 2,2'-azobis (2-amidinopropane) dihydrochloride. The resulting solution is then heated, with stirring, to 110° F. and held for 18 hours to produce a highly viscous polymer solution.

In addition, the polymerization procedure may employ a hydrocarbon reaction medium instead of water. In this case, appropriate surfactants are used to emulsify the hydrophilic/hydrophobic monomers, and the product is obtained as an oil external/water internal emulsion.

Suitable polymers prepared as described above have estimated molecular weights in the range of from about 250,000 to about 3,000,000 and have mole ratios of the hydrophilic monomer(s) to the hydrophobically modified hydrophilic monomer(s) in the range of from about 99.98:0.02 to about 90:10. Particularly suitable polymers having molecular weights and mole ratios in the ranges set forth above include, but are not limited to, an acrylamide/octadecyldimethylammoniumethyl methacrylate bromide copolymer, a dimethylaminoethyl methacrylate/hexadecyldimethylammoniumethyl methacrylate bromide copolymer, a dimethylaminoethyl methacrylate/vinyl pyrrolidone/hexadecyldimethylammoniumethyl methacrylate bromide terpolymer and an acrylamide/2-acrylamido-2-methyl propane sulfonic acid/2-ethylhexyl methacrylate terpolymer. Of these, an acrylamide/octadecyl dimethylammoniumethyl methacrylate bromide copolymer having a mole ratio of hydrophilic monomer to hydrophobically modified hydrophilic monomer of 96:4 is presently preferred.

An improved method of this invention for treating a water and hydrocarbon producing subterranean formation to reduce the water permeability thereof without substantially reducing the hydrocarbon permeability thereof is comprised of the following steps. A polymer of at least one hydrophilic monomer and at least one hydrophobically modified hydrophilic monomer is prepared having a molecular weight in the range of from about 100,000 to about 10,000,000 and having a mole ratio of hydrophilic monomer(s) to hydrophobically modified hydrophilic monomer(s) in the range of from about 99.98:0.02 to about 90:10. Thereafter, the polymer is introduced into the subterranean formation to be treated so that the polymer attaches to adsorption sites on surfaces within the porosity of the formation.

In carrying out the above described method, the polymer is preferably dissolved in an aqueous carrier liquid and the resulting solution containing the polymer is introduced into the formation. The aqueous carrier liquid can be fresh water, seawater, or an aqueous salt solution. The aqueous carrier liquid is preferably an aqueous salt solution containing one or more salts in an amount in the range of from about 2% to about 10% by weight of the solution. A variety of salts can be utilized in the aqueous solution such as potassium chloride, sodium chloride, ammonium chloride and calcium chloride.

In order to facilitate the flow of the carrier liquid solution containing the polymer into the formation being treated, a surfactant can be included in the carrier fluid solution. While a variety of surfactants can be used, a presently preferred surfactant is cocoylamidopropylbetaine. When used, the surfactant is included in the carrier liquid solution in an amount in the range of from about 0.10% to about 2.0% by weight of the solution, more preferably in an amount in the range of from about 0.5% to about 1%.

After the treatment described above whereby the polymer utilized is adsorbed onto the formation surfaces, an afterflush of a hydrocarbon liquid such as kerosene, diesel oil or crude oil or a hydrocarbon or inert gas such as methane and natural gas or nitrogen (when the formation produces gas) can be introduced into the formation. Although it is not required in order for the polymer to be effective, the hydrocarbon liquid or gas after-flush in the formation facilitates the subsequent flow of hydrocarbons through the formation.

In order to further illustrate the methods of the present invention, the following examples are given.

EXAMPLE 1

Various cationic hydrophobically modified hydrophilic monomers were prepared in accordance with the procedures described above by reacting dimethylaminoethyl methacrylate with hexadecyl bromide, octadecyl bromide and 1-bromodocosane (behenyl bromide) to produce hexadecyl, octadecyl and behenyl dimethylammonium-ethyl methacrylate bromide. Various mole percentages of the hydrophobically modified hydrophilic monomers and acrylamide were then reacted to produce copolymers having estimated molecular weights in the range of from about 250,000 to about 3,000,000. In addition, a non-ionic hydrophobic monomer, i.e., octadecylmethacrylate was dissolved in an aqueous solution containing a suitable surfactant and copolymerized with acrylamide as described above. The various copolymers produced are described in TABLE I below.

For comparison purposes, polyacrylamide and two commercially available polyacrylamide polymers of known molecular weight, i.e., "ALCOFLOOD 245S™" and "ALCOFLOOD 935™" are included in TABLE I.

A multi-pressure tap Hassler sleeve containing a Berea sandstone core was utilized to determine the water permeability reduction produced by the various copolymers described in Table I. The permeability reduction tests were run at a temperature of 175° F. utilizing a brine containing 9% by weight sodium chloride and 1% by weight calcium chloride.

The following procedure was utilized for a first series of tests, the results of which are shown in Table II below. The above described brine was flowed through the Berea core until the pressure stabilized, yielding an initial permeability. The polymer or copolymer tested was dissolved in the above described brine in an amount of 2,000 parts per million, and 100 milliliters of the treatment solution containing the polymer or copolymer was flowed into the core and overflushed through the core with 100 milliliters of the above described brine, both of which were flowed in the opposite direction to the initial brine flow. The brine flow was then resumed in the original direction until the pressure again stabilized and final permeability was calculated. The percent brine permeability reduction was calculated using the formula [1-(final permeability/initial permeability)]×100. The multi-tap Hassler sleeve allowed the core permeability to be divided into four segments. In the tests, the initial brine flow was from segment 1 through segment 4. The treatment solution and displacement brine flow were from segment 4 through segment 1, and the final brine flow was from segment 1 through segment 4. The initial and final permeabilities were calculated for the middle two segments, i.e., segments 2 and 3. The results of the tests are set forth in Table II below.

TABLE I

Copolymers Tested

| Polymer or Copolymer Number | Copolymer Description | | Mole % Ratio | | Viscosity[3], cp |
|---|---|---|---|---|---|
| | Hydrophilic Monomer | Hydrophobically Modified Hydrophilic Monomer | Hydrophilic Monomer, % | Hydrophobically Modified Hydrophilic Monomer, % | |
| 1 | (Control - polyacrylamide) | — | — | — | 5.7 |
| 1 (a) | "ALCOFLOOD 245S ™"[1] | — | — | — | .8 |
| 1 (b) | "ALCOFLOOD 935 ™"[2] | — | — | — | 29 |
| 2 | acrylamide/ | hexadecyl dimethylammonium ethylmethacrylate bromide | 98 | 2 | — |
| 3 | acrylamide/ | hexadecyl dimethylammonium ethylmethacrylate bromide | 99 | 1 | — |
| 4 | acrylamide/ | octadecyl dimethylammonium ethylmethacrylate bromide | 97 | 3 | — |
| 5 | acrylamide/ | octadecyl dimethylammonium ethylmethacrylate bromide | 98 | 2 | — |
| 6 | acrylamide/ | octadecyl dimethylammonium ethylmethacrylate bromide | 99 | 1 | — |
| 7 | acrylamide/ | octadecyl dimethylammonium ethylmethacrylate bromide | 99.5 | 0.5 | — |
| 8 | acrylamide/ | behenyl dimethylammonium ethylmethacrylate bromide | 99.98 | 0.02 | — |
| 9 | acrylamide/ | octadecyl methacrylate | 99 | 1 | — |
| 10 | acrylamide/ | octadecyl dimethylammonium ethylmethacrylate bromide | 98 | 2 | — |
| 11 | acrylamide/ | octadecyl dimethylammonium ethylmethacrylate bromide | 99 | 1 | — |
| 12 | acrylamide/ | hexadecyl dimethylammonium ethylmethacrylate bromide | 96 | 4 | — |
| 13 | acrylamide/ | hexadecyl dimethylammonium ethylmethacrylate bromide | 95 | 5 | — |
| 14 | acrylamide/ | octadecyl dimethylammonium ethylmethacrylate bromide | 97 | 3 | — |
| 15 | acrylamide/ | octadecyl dimethylammonium ethylmethacrylate bromide | 96 | 4 | — |

[1]"ALCOFLOOD 245S ™" is commercially available from Ciba Specialty Chemicals of Suffolk, Virginia, and has a molecular weight of 500,000.
[2]"ALCOFLOOD 935 ™" is commercially available from Ciba Specialty Chemicals of Suffolk, Virginia, and has a molecular weight of 5 to 6 million.
[3]The viscosities were run at 0.4% active polymer by weight in a 6% by weight aqueous NaCl solution using a Brookfield LVT viscometer with a UL adaptor at 12 rpm for "ALCOFLOOD 935 ™" and at 60 rpm for Polymer No. 1 and "ALCOFLOOD 245S ™".

TABLE II

Permeability Reduction In Berea Sandstone At 175°

| Polymer or Copolymer No. | % Brine Permeability Reduction - Segment 2 | % Brine Permeability Reduction - Segment 3 |
|---|---|---|
| 1 (Control) | 38 | 20 |
| 2 | 33 | 53 |
| 3 | 35 | 35 |
| 4 | 30 | 43 |
| 5 | 43 | 52 |
| 6 | 48 | 65 |
| 7 | 10 | 42 |
| 8 | 60 | 60 |
| 9 | 45 | 35 |

From Table II, it can be seen that the copolymers of this invention produced greater brine reduction than polymer No. 1 (unmodified polyacrylamide).

EXAMPLE 2

The tests described in Example 1 were repeated except that a different flow sequence was utilized to simulate a subterranean zone which initially produced oil but later "watered out," i.e., produced only brine but still had residual oil trapped therein. This scenario was simulated by flowing a sequence of brine and oil (kerosene) through the core. In a first set of tests, the sequence was first brine, then oil, then brine, then oil, then brine, then the treatment solution and then brine. The third brine flow was used to calculate the initial permeability to brine at residual oil conditions. This permeability was used along with the permeability calculated after the final brine flow to determine the percent brine permeability reduction. To determine the impact of thermal degradation, following the final brine flow, some testing was performed where the core was shut-in at temperature over night and flow was resumed the next day. The brine permeability was determined after the shut-in.

Another series of tests were run to simulate what happens if the treatment solution enters an oil-producing zone containing residual water. These tests were conducted with a flow sequence of a first brine flow, then an oil flow, then a second brine flow, then a second oil flow, then the treatment solution flow followed by a third oil flow. The second oil flow was used to calculate the initial oil permeability and the last oil flow was used to determine the permeability to oil after treatment. The percent oil permeability reduction was determined in the same manner as described above for determining the percent brine permeability reduction. The results of these tests are given in Table III below.

From Table III, it can be seen that the copolymers of this invention functioned to increase the brine permeability reduction as compared to polymer No. 1 (polyacrylamide).

It can also be seen that polymer No. 1 (polyacrylamide) lost effectiveness after 24 hours. In comparison, copolymer No. 10 retained its effectiveness after the 24 hour shut-in. The percent oil permeability reduction numbers were negative indicating increased oil permeability after the treatment.

EXAMPLE 3

The tests described in Examples 1 and 2 (with the exception of the oil permeability reduction tests of Example 2) were repeated except that a different flow sequence was utilized. That is, the flow sequence was first brine, then oil, then brine. The second brine flow was used to calculate the initial permeability to brine under residual oil conditions. The treatment solution was then flowed through the core and overflushed through the core with 100 milliliters of brine which was followed by 25 milliliters of oil (kerosene). Following the treatment and overflush stages, brine flow was again stabilized through the core in the original direction. The percent brine permeability reduction in segments 2 and 3 before and after a 24 hour shut-in were calculated. The results of these tests are given in Table IV below.

TABLE IV

Permeability Reduction In Berea Sandstone At 175° F.

| Polymer or Copolymer No. | % Brine Permeability Reduction - Segment 2 | % Brine Permeability Reduction - Segment 3 | % Brine Permeability Reduction - Segment 2 24 Hour Shut-in | % Brine Permeability Reduction - Segment 3 24 Hour Shut-in |
|---|---|---|---|---|
| 1 | 40 | 63 | 0 | 17 |
| 12 | 42 | 68 | 32 | 60 |
| 13 | 65 | 85 | 55 | 80 |
| 10 | 72 | 78 | 58 | 68 |
| 14 | 65 | 82 | 48 | 74 |
| 15 | 78 | 83 | 76 | 83 |

From Table IV, it can be seen that the control polyacrylamide lost its effectiveness after the 24 hour shut-in. The copolymers of the present invention produced higher levels of brine permeability reduction and maintained their effectiveness after the 24 hour shut-in.

Thus, the present invention is well adapted to carry out the objects and attain the ends and advantages mentioned as well as those which are inherent therein. While numerous

TABLE III

Permeability Reduction In Berea Sandstone At 175° F.

| Polymer or Copolymer No. | % Brine Permeability Reduction- Segment 2 | % Brine Permeability Reduction- Segment 3 | % Brine Permeability Reduction- Segment 2 24 Hour Shut-in | % Brine Permeability Reduction- Segment 3 24 Hour Shut-in | % Oil Permeability Reduction- Segment 2 | % Oil Permeability Reduction- Segment 3 |
|---|---|---|---|---|---|---|
| 1 (Control) | 25 | 45 | −65 | −30 | — | — |
| 3 | 45 | 55 | — | — | −30 | 0 |
| 4 | 55 | 72 | — | — | 20 | −10 |
| 5 | 45 | 70 | — | — | −50 | −40 |
| 10 | 35 | 50 | 35 | 50 | — | — |
| 11 | 55 | 75 | — | — | — | — |

What is claimed is:

1. An improved method of treating a water and hydrocarbon producing subterranean formation to reduce the water permeability thereof comprising introducing into said formation a water flow resisting chemical comprised of a polymer of at least one hydrophilic monomer and at least one hydrophobically modified hydrophilic monomer which attaches to adsorption sites on surfaces within the porosity of said formation and reduces the water permeability thereof without substantially reducing the hydrocarbon permeability.

2. The method of claim 1 wherein said hydrophilic monomer is selected from the group consisting of acrylamide, 2-acrylamido-2-methyl propane sulfonic acid, N,N-dimethylacrylamide, vinyl pyrrolidone, dimethylaminoethyl methacrylate, acrylic acid, dimethylaminopropylmethacrylamide, trimethylammoniumethyl methacrylate chloride, methacrylamide and hydroxyethyl acrylate.

3. The method of claim 1 wherein said hydrophobically modified hydrophilic monomer is selected from the group consisting of alkyl acrylates, alkyl methacrylates, alkyl acrylamides and alkyl methacrylamides wherein the alkyl radicals have from about 4 to about 22 carbon atoms; alkyl dimethylammoniumethyl methacrylate bromide, alkyl dimethylammoniumethyl methacrylate chloride and alkyl dimethylammoniumethyl methacrylate iodide wherein the alkyl radicals have from about 4 to about 22 carbon atoms; and alkyl dimethylammonium propylmethacrylamide bromide, alkyl dimethylammonium propylmethacrylamide chloride and alkyl dimethylammonium propylmethacrylamide iodide wherein the alkyl groups have from about 4 to about 22 carbon atoms.

4. The method of claim 1 wherein the mole ratio of said hydrophilic monomer to said hydrophobically modified hydrophilic monomer in said polymer is in the range of from about 99.98:0.02 to about 90:10.

5. The method of claim 4 wherein said polymer is selected from the group consisting of an acrylamide/octadecyldimethylammoniumethyl methacrylate bromide copolymer, a dimethylaminoethyl methacrylate/hexadecyldimethylammoniumethyl methacrylate bromide copolymer, a dimethylaminoethyl methacrylate/vinyl pyrrolidone/hexadecyldimethylammoniumethyl methacrylate bromide terpolymer and an acrylamide/2-acrylamido-2-methyl propane sulfonic acid/2-ethylhexyl methacrylate terpolymer, said polymer having a molecular weight in the range of from about 100,000 to about 10,000,000.

6. The method of claim 1 wherein said polymer is dissolved in an aqueous carrier liquid.

7. The method of claim 6 wherein said aqueous carrier liquid is an aqueous salt solution.

8. The method of claim 7 wherein said salt in said aqueous salt solution is selected from the group consisting of potassium chloride, sodium chloride, ammonium chloride and calcium chloride and is present in said aqueous salt solution in an amount in the range of from about 2% to about 10% by weight of said solution.

9. The method of claim 6 wherein said aqueous carrier liquid solution further comprises a surfactant dissolved therein.

10. The method of claim 9 wherein said surfactant is cocoylamidopropylbetaine present in an amount in the range of from about 0.1% to about 2% by weight of said carrier liquid solution.

11. The method of claim 1 which further comprises the step of introducing a hydrocarbon liquid or a gas into said formation after the introduction of said water flow resisting chemical therein.

12. The method of claim 11 wherein said liquid hydrocarbon is selected from the group consisting of kerosene, diesel oil and crude oil.

13. An improved method of treating a water and hydrocarbon producing subterranean formation to reduce the water permeability thereof without substantially reducing the hydrocarbon permeability thereof comprising the steps of:
   (a) preparing a polymer of at least one hydrophilic monomer and at least one hydrophobically modified hydrophilic monomer having a molecular weight in the range of from about 100,000 to about 10,000,000; and
   (b) introducing said polymer into said formation so that said polymer attaches to adsorption sites on surfaces within the porosity of said formation.

14. The method of claim 13 wherein said hydrophilic monomer is selected from the group consisting of acrylamide, 2-acrylamido-2-methyl propane sulfonic acid, N,N-dimethylacrylamide, vinyl pyrrolidone, dimethylaminoethyl methacrylate, acrylic acid, dimethylaminopropylmethacrylamide, trimethylammoniumethyl methacrylate chloride, methacrylamide and hydroxyethyl acrylate.

15. The method of claim 13 wherein said hydrophobically modified hydrophilic monomer is selected from the group consisting of alkyl acrylates, alkyl methacrylates, alkyl acrylamides and alkyl methacrylamides wherein the alkyl radicals have from about 4 to about 22 carbon atoms; alkyl dimethylammoniumethyl methacrylate bromide, alkyl dimethylammoniumethyl methacrylate chloride and alkyl dimethylammoniumethyl methacrylate iodide wherein the alkyl radicals have from about 4 to about 22 carbon atoms; and alkyl dimethylammonium propylmethacrylamide bromide, alkyl dimethylammonium propylmethacrylamide chloride and alkyl dimethylammonium propylmethacrylamide iodide wherein the alkyl groups have from about 4 to about 22 carbon atoms.

16. The method of claim 13 wherein the mole ratio of said hydrophilic monomer to said hydrophobically modified hydrophilic monomer in said polymer is in the range of from about 99.98:0.02 to about 90:10.

17. The method of claim 16 wherein said polymer is selected from the group consisting of an acrylamide/octadecyldimethylammoniumethyl methacrylate bromide copolymer, a dimethylaminoethyl methacrylate/hexadecyldimethylammoniumethyl methacrylate bromide copolymer, a dimethylaminoethyl methacrylate/vinyl pyrrolidone/hexadecyldimethylammoniumethyl methacrylate bromide terpolymer and an acrylamide/2-acrylamido-2-methyl propane sulfonic acid/2-ethylhexyl methacrylate terpolymer, said polymer having a molecular weight in the range of from about 100,000 to about 10,000,000.

18. The method of claim 13 wherein said polymer is dissolved in an aqueous carrier liquid.

19. The method of claim 18 wherein said aqueous carrier liquid is an aqueous salt solution.

20. The method of claim 19 wherein said salt in said aqueous salt solution is selected from the group consisting of potassium chloride, sodium chloride, ammonium chloride and calcium chloride and is present in said aqueous salt solution in an amount in the range of from about 2% to about 10% by weight of said solution.

21. The method of claim 18 wherein said aqueous carrier liquid solution further comprises a surfactant dissolved therein.

22. The method of claim 21 wherein said surfactant is cocoylamidopropylbetaine present in an amount in the range of from about 0.1% to about 2% by weight of said carrier liquid solution.

23. The method of claim 13 which further comprises the step of introducing a hydrocarbon liquid or a gas into said formation after the introduction of said water flow resisting chemical therein.

24. The method of claim 23 wherein said liquid hydrocarbon is selected from the group consisting of kerosene, diesel oil and crude oil.

25. The method of claim 23 wherein said gas is selected from the group consisting of a methane, natural gas and nitrogen.

* * * * *